(12) United States Patent
Miyata et al.

(10) Patent No.: US 7,758,940 B2
(45) Date of Patent: Jul. 20, 2010

(54) OPTICAL DISK MANUFACTURING SHEET

(75) Inventors: Sou Miyata, Matsudo (JP); Kazuya Katoh, Arlington, MA (US); Shin Kubota, Yokohama (JP)

(73) Assignee: Lintec Corporation, Tokyo (JP)

( * ) Notice: Subject to any disclaimer, the term of this patent is extended or adjusted under 35 U.S.C. 154(b) by 1276 days.

(21) Appl. No.: 10/524,061

(22) PCT Filed: Jun. 6, 2003

(86) PCT No.: PCT/JP03/07220

§ 371 (c)(1),
(2), (4) Date: Feb. 8, 2005

(87) PCT Pub. No.: WO2004/015704

PCT Pub. Date: Feb. 19, 2004

(65) Prior Publication Data

US 2006/0165942 A1 Jul. 27, 2006

(30) Foreign Application Priority Data

Aug. 8, 2002 (JP) ............................. 2002-231309

(51) Int. Cl.
*B32B 3/02* (2006.01)

(52) U.S. Cl. .................... 428/64.1; 428/64.4; 428/65.2; 430/270.11

(58) Field of Classification Search ................. 428/64.1, 428/64.4; 430/270.11
See application file for complete search history.

(56) References Cited

U.S. PATENT DOCUMENTS

| 5,085,910 A * | 2/1992 | Matsushima et al. ........ 428/64.4 |
| 5,132,152 A * | 7/1992 | Gotoh et al. ................ 428/65.1 |
| 5,770,348 A * | 6/1998 | Kondo ......................... 430/321 |
| 6,120,870 A * | 9/2000 | Nebashi et al. ............. 428/64.1 |
| 6,168,682 B1 * | 1/2001 | Bennett et al. ............... 156/295 |
| 6,440,516 B1 * | 8/2002 | Yamasaki et al. ........... 428/64.1 |
| 6,667,952 B2 * | 12/2003 | Komaki et al. ........... 369/275.5 |
| 6,770,162 B2 * | 8/2004 | Shida et al. .................. 156/230 |
| 6,823,528 B2 * | 11/2004 | Yamasaki et al. ............ 720/719 |
| 6,858,316 B2 * | 2/2005 | Kubota et al. ................ 428/500 |

(Continued)

FOREIGN PATENT DOCUMENTS

JP     A-03-116460     5/1991

(Continued)

OTHER PUBLICATIONS

International Search Report dated Oct. 7, 2003 in corresponding PCT application No. PCT/JP03/07220.

(Continued)

*Primary Examiner*—Elizabeth Mulvaney
(74) *Attorney, Agent, or Firm*—Posz Law Group, PLC (57) ABSTRACT

The present invention provides an optical disk producing sheet 1, obtained by laminating a stamper-receiving layer 11 that is energy rays-curable and whose storage elastic modulus prior to curing is from $10^3$ to $10^7$ Pa, and an adhesive layer 12 whose adhesive strength to polycarbonate is at least 200 mN/25 mm, and whose storage elastic modulus during the curing of the stamper-receiving layer 11 is from $10^3$ to $10^7$ Pa. With the optical disk producing sheet 1, separation that occurs during the production of an optical disk, or during the storage of the finished product, is prevented, and warpage in the resulting optical disk is reduced.

10 Claims, 3 Drawing Sheets

U.S. PATENT DOCUMENTS

| | | | |
|---|---|---|---|
| 6,887,547 B2 * | 5/2005 | Nishikiori et al. | 428/64.1 |
| 7,005,174 B2 * | 2/2006 | Yamasaki et al. | 428/64.1 |
| 2002/0037413 A1 * | 3/2002 | Kishioka et al. | 428/412 |
| 2002/0098361 A1 | 7/2002 | Bennett et al. | |
| 2003/0179687 A1 * | 9/2003 | Schoeppel et al. | 369/273 |
| 2004/0257972 A1 * | 12/2004 | Kitano et al. | 369/275.5 |
| 2005/0142318 A1 * | 6/2005 | Nakabayashi et al. | 428/40.1 |
| 2006/0280110 A1 * | 12/2006 | Katoh et al. | 369/283 |

FOREIGN PATENT DOCUMENTS

| | | |
|---|---|---|
| JP | A-07-287864 | 10/1995 |
| JP | A-10-222870 | 8/1998 |
| JP | A-10-283682 | 10/1998 |
| JP | A-2000-036135 | 2/2000 |
| JP | A-2001-226647 | 8/2001 |
| JP | A-2001-357561 | 12/2001 |
| JP | A-2002-117584 | 4/2002 |
| JP | A-2002-170284 | 6/2002 |
| JP | A-2003-045091 | 2/2003 |
| JP | A-2003-067984 | 3/2003 |
| JP | A-2003-123332 | 4/2003 |
| JP | A-2003-132593 | 5/2003 |
| JP | A-2003-263802 | 9/2003 |

OTHER PUBLICATIONS

European Search Report dated May 9, 2008 in corresponding European patent application No. 03733310.1-2210.

Office Action dated Aug. 27, 2008 in corresponding European patent application No. 03733310.1-2210.

* cited by examiner

OPTICAL DISK MANUFACTURING SHEET

TECHNICAL FIELD

This invention relates to a sheet used for producing an optical disk, and more particularly relates to an optical disk producing sheet to which the concavo-convex pattern of a stamper is transferred and pits or grooves are formed.

BACKGROUND ART

A known method for producing an optical disk is to laminate a dry photo-setting film (corresponds to the stamper-receiving layer in the present invention) on an optical disk substrate composed of a polycarbonate (polycarbonate disk), then press a stamper to the dry photo-setting film, irradiate the photo-setting film with light to cure the film, then separate the photoset film from the stamper and form a light reflecting layer on the embossed surface of the photoset film (Japanese Patent No. 2,956,989).

Photo-setting films cure when irradiated with light, which decreases their adhesive strength and allows them to be separated from a stamper, but at the same time, there is also a decrease in their adhesive strength to polycarbonate, which is what the optical disk substrate is made of. Consequently, there is a problem that separation will occur between a photoset film and an optical disk substrate made of polycarbonate during the production of the optical disk, or that interlayer separation will occur under certain conditions during the storage of the completed optical disk.

Also, the curing reaction induced by irradiation with light causes a photo-setting film to shrink, and the shrinkage stress produced in the photo-setting film by the shrinkage exerts a force in the shrinkage direction against the side of the optical disk substrate that is in contact with the photo-setting film, resulting in warping in the optical disk that is obtained.

DISCLOSURE OF THE INVENTION

The present invention was conceived in light of this situation, and it is an object thereof to provide an optical disk producing sheet, with which separation that occurs during the production of an optical disk, or during the storage of the finished product, is prevented, and warpage in the resulting optical disk is reduced.

To achieve the stated object, the present invention provides an optical disk producing sheet, comprising a stamper-receiving layer that is energy rays-curable and whose storage elastic modulus prior to curing is from $10^3$ to $10^7$ Pa, and an adhesive layer whose adhesive strength to polycarbonate is at least 200 mN/25 mm, and whose storage elastic modulus during the curing of the stamper-receiving layer is from $10^3$ to $10^7$ Pa, wherein the stamper-receiving layer and the adhesive layer are laminated (1).

With the above invention (1), the adhesive strength of the adhesive layer with respect to polycarbonate is set higher than the ordinary adhesive strength of the cured stamper-receiving layer with respect to the stamper, so when the cured stamper-receiving layer and the stamper are separated each other, there is no separation between the adhesive layer (stamper-receiving layer) and the polycarbonate substrate, sheet, film, or other such polycarbonate layer.

Also, with the above invention (1), the stamper-receiving layer can be bonded to a polycarbonate layer via the adhesive layer that has high adhesive strength to polycarbonate, which prevents separation between the polycarbonate layer and the stamper-receiving layer during storage of the finished product.

Furthermore, with the above invention (1), because the storage elastic modulus of the adhesive layer is from $10^3$ to $10^7$ Pa during the curing of the stamper-receiving layer, even if the curing reaction produces shrinkage stress in the stamper-receiving layer, the adhesive layer is able to moderate the shrinkage stress and reduce the force in the shrinkage direction exerted by the stamper-receiving layer on the optical disk substrate, cover sheet, or other such component to be bonded, which makes it possible to reduce warpage of the resulting optical disk.

With the above invention (1), the adhesive layer is preferably constituted by a pressure sensitive adhesive (2), and in the above invention (2), the pressure sensitive adhesive preferably has as a constituent component an acrylic ester copolymer (3). An adhesive such as this has excellent adhesion to the stamper-receiving layer and to polycarbonate, and its storage elastic modulus can be easily set to the range given above.

With the above inventions (1 to 3), the stamper-receiving layer preferably has as a constituent component an acrylic ester copolymer having an energy rays-curable group on a side chain thereof (4). This acrylic ester copolymer has properties that are favorable as the stamper-receiving layer, making possible the precise transfer to the concavo-convex pattern on the stamper, and when it is separated from the stamper after curing, there is almost no deposition onto the stamper.

With the above inventions (1 to 4), the stamper-receiving layer preferably contains a carboxyl group-containing copolymer obtained by copolymerizing at least one type of monomer having a carboxyl group (5). When carboxyl groups are present in the material constituting the stamper-receiving layer, the adhesive strength between the stamper-receiving layer and a reflecting film composed of a metal thin layer formed on the stamper-receiving layer will be higher, which prevents separation between the stamper-receiving layer and the reflecting film during the storage of the finished product.

BEST MODE FOR CARRYING OUT THE INVENTION

Embodiments of the present invention will now be described.

[Optical Disk Manufacturing Sheet]

Figure 1:
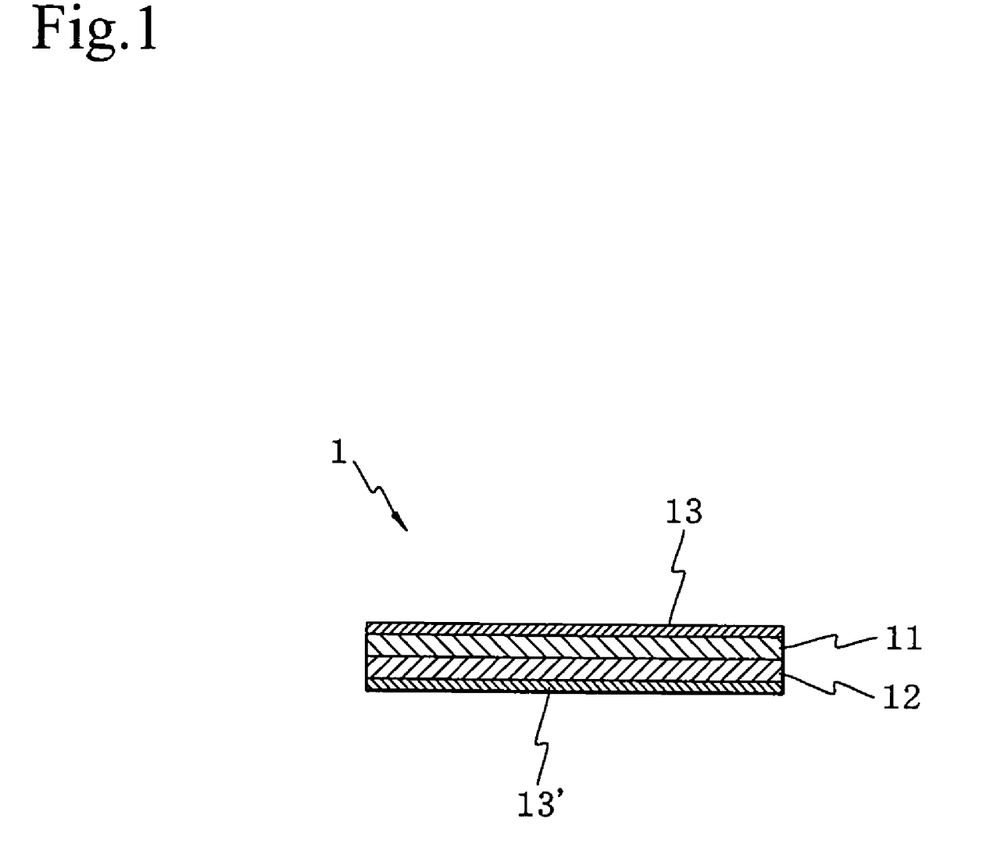
FIG. 1 is a cross section of the optical disk producing sheet pertaining to an embodiment of the present invention.

FIG. 1 is a cross section of the optical disk producing sheet pertaining to an embodiment of the present invention.

As shown in FIG. 1, the optical disk producing sheet 1 pertaining to this embodiment is obtained by laminating a release sheet 13', an adhesive layer 12, a stamper-receiving layer 11, and a release sheet 13. The release sheets 13 and 13' are peeled off when the optical disk producing sheet 1 is used.

The stamper-receiving layer 11 is a layer on which concavo-convex pattern formed on the stamper is transferred and pits or grooves are formed. This stamper-receiving layer 11 is energy rays-curable, and the storage elastic modulus of the stamper-receiving layer 11 prior to curing is from $10^3$ to $10^7$ Pa, and preferably from $10^4$ to $5 \times 10^6$ Pa.

Here, the temperature at which the "storage elastic modulus prior to curing" is measured is to be the same as the temperature of the working environment in which the stamper and the optical disk producing sheet 1 are superimposed (pressed together). Specifically, when the stamper and the optical disk producing sheet 1 are superimposed at room temperature, the storage elastic modulus is measured at room temperature, and when the stamper and the optical disk producing sheet 1 are superimposed under heating, the storage elastic modulus is measured at the same temperature as the heating temperature.

If the storage elastic modulus of the stamper-receiving layer 11 prior to curing is within the above range, merely pressing the stamper to the stamper-receiving layer 11 can precisely transfer the concavo-convex pattern formed on the stamper onto the stamper-receiving layer 11, making it extremely easy to produce an optical disk.

The storage elastic modulus of the stamper-receiving layer 11 after curing is preferably at least $10^7$ Pa, with $10^8$ to $10^{11}$ Pa being particularly favorable. Here, the temperature at which the "storage elastic modulus after curing" is measured is to be the same as the temperature of the environment in which the optical disk is stored, that is, room temperature.

If the storage elastic modulus of the stamper-receiving layer 11 after curing is within the above range, the pits or grooves transferred to the stamper-receiving layer 11 can be securely fixed by curing, so there will be no danger of the pits or grooves being destroyed or deformed in the course of separating the stamper and the stamper-receiving layer 11.

The main component of the stamper-receiving layer 11 is preferably an energy rays-curable polymer, but the main component may also be a mixture of a polymer that is not energy rays-curable and an energy rays-curable polyfunctional monomer or oligomer.

The stamper-receiving layer 11 will now be described for a case in which the main component is an energy rays-curable polymer.

The energy rays-curable polymer component that constitutes the stamper-receiving layer 11 is preferably an acrylic ester copolymer having an energy rays-curable group on a side chain thereof. This acrylic ester copolymer is preferably an energy rays-curable copolymer (A) having a molecular weight of at least 100,000 and having an energy rays-curable group on a side chain thereof, obtained by reacting an acrylic copolymer (a1) having monomer units that contain functional groups and a unsaturated group-containing compound (a2) having substituents that bond to these functional groups.

The acrylic copolymer (a1) is composed of structural units derived from a monomer containing a functional group, and structural units derived from a (meth)acrylic ester monomer or derivative thereof.

The monomer containing a functional group in the acrylic copolymer (a1) is a monomer having in its molecule a polymerizable double bond and a functional group such as a hydroxyl group, carboxyl group, amino group, substituted amino group, or epoxy group, and is preferably an unsaturated monomer containing a hydroxyl group or an unsaturated monomer containing a carboxyl group.

More specific examples of such monomers containing a functional group include 2-hydroxyethyl acrylate, 2-hydroxyethyl methacrylate, 2-hydroxypropyl acrylate, 2-hydroxypropyl methacrylate, and other such acrylates containing a hydroxyl group, and acrylic acid, methacrylic acid, itaconic acid, and other such compounds containing a carboxyl group. These can be used singly or in combinations of two or more.

This monomer containing a functional group is preferably selected such that carboxyl groups can be present in the energy rays-curable copolymer. If carboxyl groups are present in the energy rays-curable copolymer, the adhesive strength between stamper-receiving layer 11 and the metal thin layer (such as a reflective layer used for recording and playback) formed on the stamper-receiving layer 11 can be higher, which improves the strength and durability of the resulting optical disk.

The amount of the carboxyl groups which are present in the energy rays-curable copolymer, in terms of monomer, is preferably from 0.01 to 30 mol %, and even more preferably from 5.0 to 20 mol %. When carboxyl groups are reacted with the unsaturated group-containing compound (a2) discussed below (that is, when the functional group-containing monomer is a carboxyl group-containing monomer), the carboxyl group content is the value calculated on the basis of (number of moles of carboxyl group-containing monomer)−(number of moles of unsaturated group-containing compound).

A cycloalkyl (meth)acrylate, a benzyl (meth)acrylate, or a (meth)acrylic alkyl ester in which the carbon number of the alkyl group is from 1 to 18 is used as the (meth)acrylic ester monomer that constitutes the acrylic copolymer (a1). Of these, it is particularly favorable to use a (meth)acrylic alkyl ester in which the carbon number of the alkyl group is from 1 to 18, such as methyl (meth)acrylate, ethyl (meth)acrylate, propyl (meth)acrylate, n-butyl (meth)acrylate, 2-ethylhexyl (meth)acrylate or the like.

The acrylic copolymer (a1) contains structural units derived from the above-mentioned functional group-containing monomer in a ratio that is usually 3 to 100 wt %, and preferably 5 to 40 wt %, and especially 10 to 30 wt %, and contains structural units derived from a (meth)acrylic ester monomer or derivative thereof in a ratio that is usually 0 to 97 wt %, and preferably 60 to 95 wt %, and especially 70 to 90 wt %.

The acrylic copolymer (a1) is obtained by copolymerizing the above-mentioned functional group-containing monomer and the (meth)acrylic ester monomer or derivative thereof by a standard method, but a small amount (such as a proportion of 10 wt % or less, and preferably 5 wt % or less) of vinyl formate, vinyl acetate, styrene, or the like may also be copolymerized in addition to the above monomers.

The energy rays-curable copolymer (A) is obtained by reacting the above-mentioned acrylic copolymer (a1) having functional group-containing monomer units with an unsaturated group-containing compound (a2) having a substituent that bonds to the functional group.

The substituent in the unsaturated group-containing compound (a2) can be suitably selected according to the type of functional group of the functional group-containing monomer in the acrylic copolymer (a1). For instance, when the functional group is a hydroxyl group, amino group, or substituted amino group, an isocyanate group or epoxy group is favorable as the substituent; when the functional group is a carboxyl group, an aziridinyl group, epoxy group, or oxazoline group is favorable as the substituent; and when the functional group is an epoxy group, an amino group, carboxyl group, or aziridinyl group is favorable as the substituent. One such substituent is contained per molecule of the unsaturated group-containing compound (a2).

The unsaturated group-containing compound (a2) has 1 to 5, and preferably 1 to 2, energy rays-curable carbon-carbon double bonds per molecule. Specific examples of such an unsaturated group-containing compound (a2) include methacryloyloxyethyl isocyanate, meta-isopropenyl-$\alpha,\alpha$-dimethylbenzyl isocyanate, methacryloyl isocyanate, allyl isocyanate; an acryloyl monoisocyanate compound obtained by reacting a diisocyanate compound or polyisocyanate compound and a hydroxyethyl (meth)acrylate; an acryloyl monoisocyanate compound obtained by reacting a diisocyanate compound or polyisocyanate compound, a polyol compound, and a hydroxyethyl (meth)acrylate; glycidyl (meth)acrylate; (meth)acrylic acid, 2-(1-aziridinyl)ethyl(meth)acrylate, 2-vinyl-2-oxazoline, and 2-isopropenyl-2-oxazoline.

The unsaturated group-containing compound (a2) is usually used in a proportion of 20 to 100 equivalents, and preferably 40 to 95 equivalents, and especially 60 to 90 equivalents, per 100 equivalents of the functional group-containing monomer of the acrylic copolymer (a1).

In the reaction between the acrylic copolymer (a1) and the unsaturated group-containing compound (a2), the temperature, pressure, solvent, duration, use of a catalyst, and type of catalyst can be suitably selected according to the combination of the functional group and the substituent. As a result, the functional groups present in side chains of the acrylic copolymer (a1) react with the substituents in the unsaturated group-containing compound (a2), unsaturated groups are introduced into the side chains of the acrylic copolymer (a1), and the energy rays-curable copolymer (A) is obtained. The reaction rate of the functional groups and substituents in the reaction is usually at least 70%, and preferably at least 80%, and unreacted functional groups can remain in the energy rays-curable copolymer (A).

The weight average molecular weight of the energy rays-curable copolymer (A) obtained in this manner is at least 100,000, and preferably from 150,000 to 1,500,000, and especially from 200,000 to 1,000,000.

Here, when ultraviolet rays are used as the energy rays, the polymerization curing time and the irradiation dose can be reduced by adding a photopolymerization initiator (B) to the energy rays-curable copolymer (A).

Specific examples of the photopolymerization initiator (B) include benzophenone, acetophenone, benzoin, benzoin methyl ether, benzoin ethyl ether, benzoin isopropyl ether, benzoin isobutyl ether, benzoin benzoic acid, methyl benzoin benzoate, benzoin dimethyl ketal, 2,4-diethylthioxanthone, 1-hydroxycyclohexyl phenyl ketone, benzyl diphenyl sulfide, tetramethylthiuram monosulfide, azobisisobutyronitrile, benzyl, dibenzyl, diacetyl, $\beta$-chloranthraquinone, (2,4,6-trimethylbenzyldiphenyl)phosphone oxide, 2-benzothiazole-N,N-diethyldithiocarbamate, and oligo{2-hydroxy-2-methyl-1-[4-(1-propenyl)phenyl]propanone}. These may be used singly or in combinations of two or more. The photopolymerization initiator (B) is used in an amount of 0.1 to 10 parts by weight of, and particularly 0.5 to 5 parts by weight of, per 100 parts by weight of the energy rays-curable copolymer (A).

Other components may be added as needed along with the energy rays-curable copolymer (A) and the photopolymerization initiator (B) in the stamper-receiving layer 11. Examples of other components include a polymer component or oligomer component that is not energy rays-curable (C), a polyfunctional monomer or oligomer component that is energy rays-curable (D), a crosslinking agent (E), and other additives (F).

Examples of the polymer component or oligomer component that is not energy rays-curable (C) include polyacrylic ester, polyester, polyurethane, polycarbonate, and polyolefin. A polymer or oligomer with a weight average molecular weight of 3,000 to 2,500,000 is preferred.

Examples of the polyfunctional monomer or oligomer component that is energy rays-curable (D) include trimethylolpropane tri(meth)acrylate, pentaerythritol tri(meth)acrylate, pentaerythritol tetra(meth)acrylate, dipentaerythritol hexa(meth)acrylate, 1,4-butanediol di(meth)acrylate, 1,6-hexanediol di(meth)acrylate, polyethylene glycol di(meth)acrylate, polyester oligo(meth)acrylate, and polyurethane oligo(meth)acrylate.

As the crosslinking agent (E), a polyfunctional compound that is reactive with the functional groups in the energy rays-curable copolymer (A) and so forth can be used. Examples of such polyfunctional compounds include isocyanate compounds, epoxy compounds, amine compounds, melamine compounds, aziridine compounds, hydrazine compounds, aldehyde compounds, oxazoline compounds, metal alkoxide compounds, metal chelate compounds, metal salts, ammonium salts, and reactive phenol resins.

Examples of the other additives (F) include UV absorbents, plasticizers, fillers, antioxidants, tackifiers, pigments, dyes, and coupling agents.

The addition of these other components (C) to (F) to the stamper-receiving layer 11 sometimes improves ease of transfer of the concavo-convex pattern prior to curing, strength after curing, adhesion to and release from other layers, and storage stability.

A case will now be described in which the main component of the stamper-receiving layer 11 is a mixture of a polymer component that is not energy rays-curable and a polyfunctional monomer or oligomer that is energy rays-curable.

The same components as with the acrylic copolymer (a1) discussed above can be used as the polymer component used in the stamper-receiving layer 11. Of the acrylic copolymers (a1), it is preferable to select an acrylic copolymer that has carboxyl groups as functional groups because this will afford better adhesion between the stamper-receiving layer 11 and the metal thin layer formed on the stamper-receiving layer 11.

The polyfunctional monomer or oligomer that is energy rays-curable can be selected the same as with component (D) discussed above. The blend ratio of the polymer component and the polyfunctional monomer or oligomer that is energy rays-curable is preferably 10 to 150 parts by weight of, and especially 25 to 100 parts by weight of polyfunctional monomer or oligomer per 100 parts by weight of polymer component.

The other additives (F) discussed above can also be added to the stamper-receiving layer 11. Even when these other additives (F) are added, though, the storage elastic modulus of the stamper-receiving layer 11 still needs to be between $10^3$ and $10^7$ Pa, and it is preferable for the design to reduce the amount of deposits remaining from the stamper-receiving layer 11 on the stamper. The amount in which these other additives (F) are added is preferably 0 to 50 parts by weight of, and especially 0 to 20 parts by weight of the total amount of these other additives (F) per 100 parts by weight of the energy rays-curable copolymer (A).

Here, the thickness of the stamper-receiving layer 11 is determined according to the depth of the pits or grooves to be formed, but is usually about 5 to 30 μm, and preferably about 10 to 20 μm.

Meanwhile, the adhesive layer 12 serves to bond the stamper-receiving layer 11 to an optical disk substrate or cover sheet. The optical disk substrate or cover sheet is substantially made of polycarbonate in order to satisfy the optical characteristics required of an optical disk.

The adhesive strength of the adhesive layer 12 to polycarbonate is at least 200 mN/25 mm, and preferably at least 400 mN/25 mm. Such adhesive strength of the adhesive layer 12 can prevent the optical disk producing sheet from separating from the polycarbonate material. Also, even in the event that the optical disk is stored over the long term, interfacial separation at the adhesive layer 12 that would otherwise result from inadequate adhesive strength of the adhesive layer 12 can be prevented.

The storage elastic modulus of the adhesive layer 12 is from $10^3$ to $10^7$ Pa, and preferably $10^4$ to $10^6$ Pa, during the curing of the stamper-receiving layer 11. The stamper-receiving layer 11 will shrink as the curing reaction proceeds (approximately 3 to 7% as volumetric shrinkage), but as long as the storage elastic modulus of the adhesive layer 12 is within the above range, even if shrinkage stress is produced in the stamper-receiving layer 11, the adhesive layer 12 will be able to moderate the shrinkage stress and reduce the force in the shrinkage direction exerted by the stamper-receiving layer on the object being bonded (optical disk substrate or cover sheet), which makes it possible to reduce warpage of the resulting optical disk. If the storage elastic modulus of the adhesive layer 12 is less than $10^3$ Pa, the adhesive layer 12 may be deformed by the heat produced in the formation of a reflective layer by sputtering or the like on the stamper-receiving layer 11, or the adhesive layer 12 may be deformed over time even at normal temperature.

The adhesive layer 12 is preferably constituted by a pressure sensitive adhesive, which may be either a non-curable pressure sensitive adhesive or a curable pressure sensitive adhesive. As to the type of pressure sensitive adhesive, it may be based on acrylic, polyester, urethane, rubber, silicone, or the like, but of these, it is preferable to use an acrylic pressure sensitive adhesive in which an acrylic ester copolymer is a constituent component.

Examples of favorable acrylic ester copolymers include a copolymer obtained by copolymerizing (meth)acrylic esters in which the alkyl group of the ester portion has a carbon number of 1 to 20, a monomer having a functional group that contains active hydrogen, and another monomer which can be used as desired.

Examples of (meth)acrylic esters in which the alkyl group of the ester portion has a carbon number of 1 to 20 include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate. These may be used singly or in combinations of two or more.

Examples of monomers having a functional group that contains active hydrogen include 2-hydroxyethyl(meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and other such hydroxyalkyl esters of (meth)acrylic acid; acrylamide, methacrylamide, N-methylacrylamide, N-methylmethacrylamide, N-methylolacrylamide, N-methylolmethacrylamide, and other such acrylamides; monomethylaminoethyl (meth)acrylate, monoethylaminoethyl (meth)acrylate, monomethylaminopropyl (meth)acrylate, monoethylaminopropyl (meth)acrylate, and other such monoalkylaminoalkyl (meth)acrylates; and acrylic acid, methacrylic acid, crotonic acid, maleic acid, itaconic acid, citraconic acid, and other such ethylenic unsaturated carboxylic acids. These monomers may be used singly or in combinations of two or more.

Examples of other monomers used as desired include vinyl acetate, vinyl propionate, and other such vinyl esters; styrene, α-methylstyrene, and other such styrene monomers; butadiene, isoprene, chloroprene, and other such diene monomers; acrylonitrile, methacrylonitrile, and other such nitrile monomers; and N,N-dimethylacrylamide, N,N-dimethylmethacrylamide, and other such N,N-dialkyl-substituted acrylamides. These monomers may be used singly or in combinations of two or more.

There are no particular restrictions on the copolymerization configuration of the acrylic ester copolymer, which may be either a random copolymer, a block copolymer, or a graft copolymer. In order to ensure good reliability of the optical disk, the weight average molecular weight of the acrylic ester copolymer is preferably between 500,000 and 2,000,000. This weight average molecular weight is the value calculated as polystyrene, measured by gel permeation chromatography (GPC).

The above acrylic ester copolymers may be used singly or in combinations of two or more.

The above-mentioned acrylic pressure sensitive adhesive preferably contains a crosslinking agent. There are no particular restrictions on the type of crosslinking agent, which can be any crosslinking agent used in conventional acrylic pressure sensitive adhesive. For example, one can be suitably selected from among polyisocyanate compounds, epoxy resins, melamine resins, urea resins, dialdehydes, methylol polymers, metal chelate compounds, metal alkoxides, metal salts, and so on.

The adhesive layer 12 may contain various components as desired, but preferably has a low content of components that would corrode polycarbonate, such as acrylamide and other such basic components.

The adhesive layer 12 may be constituted by an adhesive that is curable, such as one that is energy rays-curable, in which case the storage elastic modulus of the adhesive layer 12 should be from $10^3$ to $10^7$ Pa during the curing of the stamper-receiving layer 11.

The constituent material of the energy rays-curable adhesive can be the same component as the energy rays-curable polymer component that constituents the stamper-receiving layer 11 as described above. In order to keep the storage elastic modulus of the adhesive layer 12 within the above range, however, the unsaturated group-containing compound (a2) is preferably used in a proportion of 1 to 20 equivalents per 100 equivalents of the functional group-containing monomer of the acrylic copolymer (a1), and the blend ratio of the polymer and the polyfunctional monomer or oligomer that is energy rays-curable is preferably 1 to 20 parts by weight of polyfunctional monomer or oligomer per 100 parts by weight of polymer component.

The thickness of the adhesive layer 12 is usually about 5 to 30 μm, and preferably about 10 to 20 μm.

With the optical disk producing sheet 1 pertaining to this embodiment, the stamper-receiving layer 11 and the adhesive layer 12 are prone to deformation under pressure, and in order to prevent this, the release sheet 13 is laminated to the stamper-receiving layer 11, and the release sheet 13' is laminated to the adhesive layer 12. The release sheets 13 and 13' can be types known in the past; for example, a polyethylene terephthalate, polypropylene, or other resin film that has undergone a release treatment with a silicone release agent or the like can be used.

In order to impart smoothness to the stamper-receiving layer 11, the release sheet 13 preferably has a surface roughness (Ra) of no more than 0.1 μm on the side that has undergone the release treatment (the side in contact with the stamper-receiving layer 11). The thickness of the release sheets 13 and 13' is usually about 10 to 200 μm, and preferably about 20 to 100 μm.

Usually, the release sheet 13' is peeled away first, and the release sheet 13 is peeled away later, so it is preferable for the release sheet 13' to be a light-release type, and for the release sheet 13 to be a heavy-release type, but whether the release sheet 13 on the stamper-receiving layer 11 side is peeled first, or the release sheet 13' on the adhesive layer 12 side is peeled first can vary with the optical disk producing procedure, so whether a light-release type or heavy-release type is used for the release sheets 13 and 13' laminated on either side can be determined by the selected optical disk producing procedure.

[Production of Optical Disk Producing Sheet]

To produce the optical disk producing sheet 1 pertaining to this embodiment, first a coating agent for the stamper-receiving layer 11 containing the material that constituted the stamper-receiving layer 11 and, if desired, a solvent is prepared, and a coating agent for the adhesive layer 12 containing the material that constituted the adhesive layer 12 and, if desired, a solvent is prepared.

Then, (1) the stamper-receiving layer 11 is formed by applying the coating agent for the stamper-receiving layer 11 to the release sheet 13, after that the adhesive layer 12 is formed by applying the coating agent for the adhesive layer 12 to the stamper-receiving layer 11, and the other release sheet 13' is laminated on the surface of the adhesive layer 12, (2) the adhesive layer 12 is formed by applying the coating agent for the adhesive layer 12 to the release sheet 13', after that the stamper-receiving layer 11 is formed by applying the coating agent for the stamper-receiving layer 11 to the adhesive layer 12, and the other release sheet 13 is laminated on the surface of the stamper-receiving layer 11, (3) the stamper-receiving layer 11 is formed by applying the coating agent for the stamper-receiving layer 11 to the release sheet 13, while the adhesive layer 12 is formed by applying the coating agent for the adhesive layer 12 to the release sheet 13', and the stamper-receiving layer 11 and the adhesive layer 12 are laminated by being superposed one over the other, or (4) the coating agent for the stamper-receiving layer 11 and the coating agent for the adhesive layer 12 are simultaneously applied by co-extrusion to form the stamper-receiving layer 11 and the adhesive layer 12. The coating agents can be applied, for example, with a kiss roll coater, a reverse roll coater, a knife coater, a roll knife coater, a die coater, or another such coating machine.

[Production of Optical Disk (1)]

Figure 2:
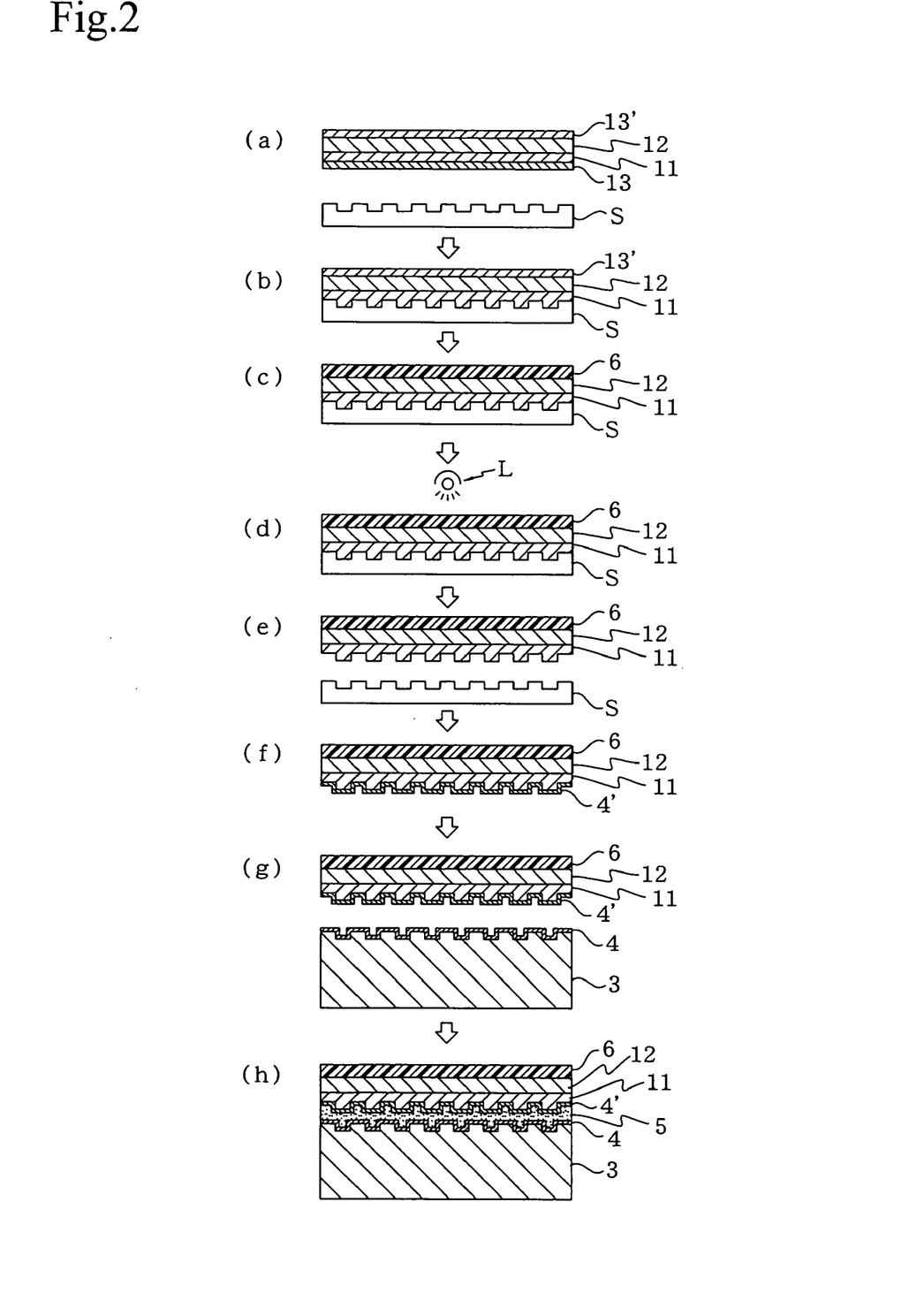
FIG. 2 is a cross section of an example of an optical disk producing method in which the optical disk producing sheet pertaining to the same embodiment is used.

An example will be described of the method for producing an optical disk using the above-mentioned optical disk producing sheet 1. FIGS. 2(a) to 2(h) are cross sections illustrating an example of producing an optical disk using the optical disk producing sheet 1.

First, as shown in FIGS. 2(a) and 2(b), the release sheet 13 is peeled away from the stamper-receiving layer 11 side of the optical disk producing sheet 1, and the exposed stamper-receiving layer 11 is pressed to a stamper S to transfer the concavo-convex pattern of the stamper S onto the stamper-receiving layer 11. If the storage elastic modulus of the stamper-receiving layer 11 at room temperature is between $10^3$ and $10^7$ Pa, the pressing of the stamper S can be performed at room temperature.

The stamper S is made from a metal material such as a nickel alloy, or a transparent resin material such as a norbornene resin. The stamper S shown in FIGS. 2(a) to 2(e) is in the form of a sheet, but is not limited to this, and may instead be in the form of a roll.

Next, as shown in FIG. 2(c), the release sheet 13' is peeled off the adhesive layer 12, and a cover sheet 6 composed of polycarbonate is laminated and press bonded to the exposed adhesive layer 12. This cover sheet 6 constitutes the light receiving side of the optical disk.

Then, as shown in FIG. 2(d), with the stamper S held tightly against the stamper-receiving layer 11, an energy ray irradiation apparatus (a UV lamp L is shown as an example in FIG. 2(d)) is used to irradiate the stamper-receiving layer 11 with energy rays from the cover sheet 6 side. The energy rays-curable material that constitutes the stamper-receiving layer 11 is cured thereby, and the storage elastic modulus is increased.

Ultraviolet rays, electron rays, or the like is usually used as the energy rays. The irradiation dose of energy rays can vary with the type of energy rays being used, but in the case of ultraviolet rays, for instance, about 100 to 500 mJ/cm$^2$ of light quantity is preferable, while in the case of electron rays, about 10 to 1000 krad is preferable.

At this time, the curing of the energy rays-curable material produces shrinkage stress in the stamper-receiving layer 11, but the adhesive layer 12 is able to moderate the shrinkage stress and reduce the force in the shrinkage direction exerted by the stamper-receiving layer 11 to the cover sheet 6, which reduces warpage of the cover sheet 6 and, also, the resulting optical disk.

After that, as shown in FIG. 2(e), the stamper S is separated from the stamper-receiving layer 11. Since the adhesive strength of the adhesive layer 12 to polycarbonate is at least 200 mN/25 mm, and is set higher than the adhesive strength of the stamper-receiving layer 11 to the stamper S, the separation of the adhesive layer 12 and the cover sheet 6 is prevented when the stamper S is separated from the stamper-receiving layer 11.

Once the concavo-convex pattern of the stamper S has been transferred to and fixed on the stamper-receiving layer 11 to form pits or grooves as above, a translucent reflective layer 4' composed of silver, a silver alloy, aluminum, or another such metal thin layer is then formed on the surface of the stamper-receiving layer 11 by sputtering or another such means as shown in FIG. 2(f).

Here, if carboxyl groups are present in the material that constitutes the stamper-receiving layer 11 here, the adhesive strength between the stamper-receiving layer 11 and the translucent reflective layer 4' can be higher, which increases the strength, durability, and so forth of the optical disk that is obtained.

Apart from the cover sheet 6, adhesive layer 12, stamper-receiving layer 11, and translucent reflective layer 4', as shown in FIG. 2(g), an optical disk substrate 3 that is composed of polycarbonate and has a specific concavo-convex pattern is formed by injection molding or another such molding method, and a reflective layer 4 composed of a metal thin layer is formed by sputtering or another such means over the concavo-convex pattern.

Finally, as shown in FIG. 2(h), the laminate on which the translucent reflective layer 4' is formed (the cover sheet 6+the adhesive layer 12+the stamper-receiving layer 11+the translucent reflective layer 4') and the optical disk substrate 3 on which the reflective layer 4 is formed are bonded via an adhesive 5 so that the translucent reflective layer 4' and the reflective layer 4 face each other.

The result of the above is that interlayer separation is prevented, and an optical disk with almost no warpage (less than 0.2° warpage) is obtained.

[Production of Optical Disk (2)]

Figure 3:
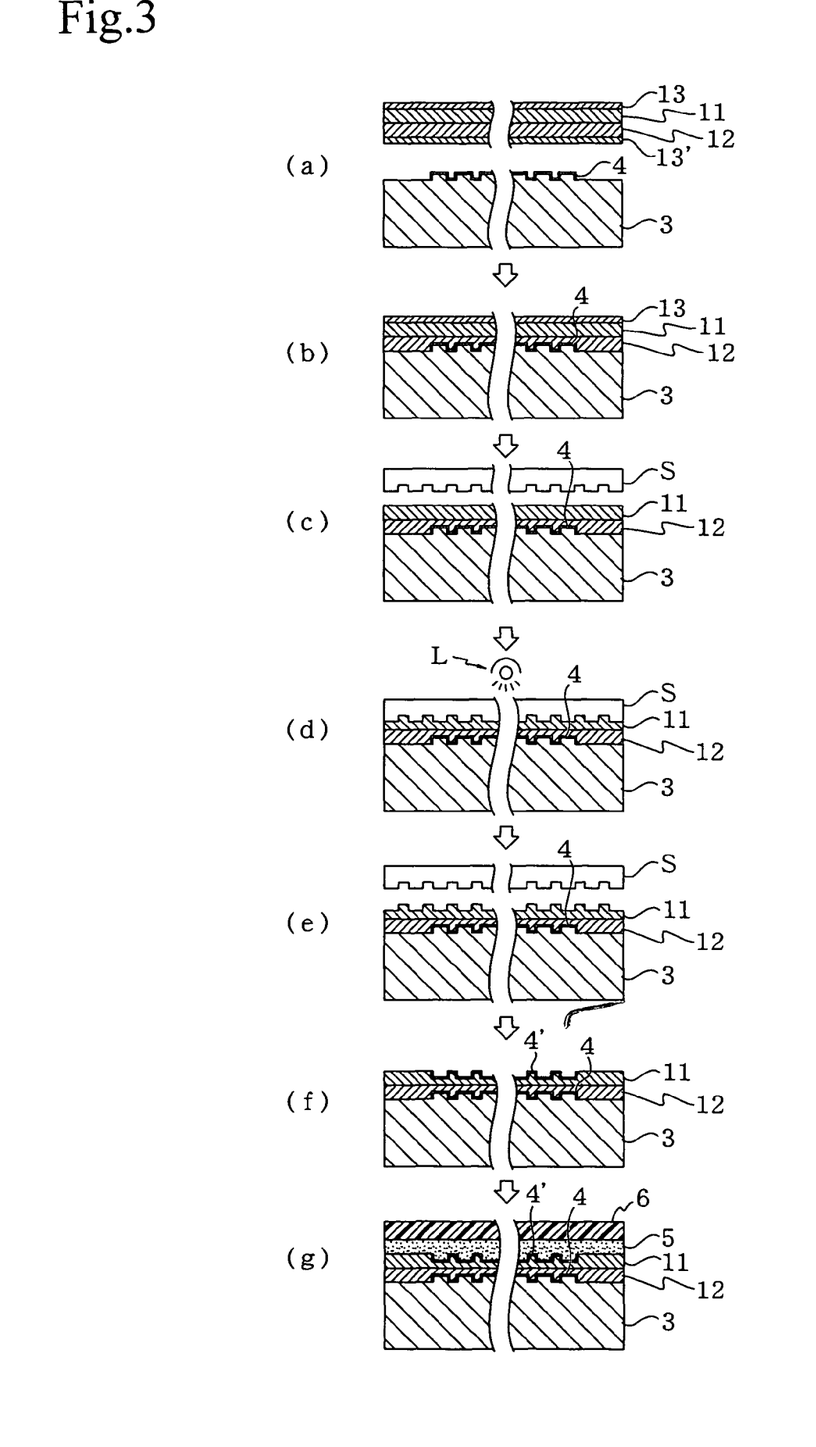
FIG. 3 is a cross section of another example of an optical disk producing method in which the optical disk producing sheet pertaining to the same embodiment is used.

Another example will be described of the method for producing an optical disk using the above-mentioned optical disk producing sheet 1. FIGS. 3(*a*) to 3(*g*) are cross sections illustrating an example of producing an optical disk using the optical disk producing sheet 1.

First, as shown in FIG. 3(*a*), an optical disk substrate 3 having a specific concavo-convex pattern is formed by injection molding or another such molding method, and a reflective layer 4 composed of a metal thin layer is formed by sputtering or another such means over the concavo-convex pattern. Here, the reflective layer 4 is not to formed at the edge portion of the optical disk substrate 3, so polycarbonate, which is the material of the optical disk substrate 3, is exposed around the edge portion of the optical disk substrate 3.

As shown in FIG. 3(*b*), the release sheet 13' on the adhesive layer 12 of the optical disk producing sheet 1 is peeled away, and the exposed adhesive layer 12 is laminated and press bonded to the optical disk substrate 3 on which the reflective layer 4 has been formed. Then, as shown in FIG. 3(*c*), the release sheet 13 laminated over the stamper-receiving layer 11 is peeled away to expose the stamper-receiving layer 11.

Next, as shown in FIG. 3(*d*), a transparent stamper S is pressed to the exposed stamper-receiving layer 11, and the concavo-convex pattern of the stamper S is transferred to the stamper-receiving layer 11. In this state, an energy ray irradiation apparatus (a UV lamp L is shown as an example in FIG. 3(*d*)) is used to irradiate the stamper-receiving layer 11 with energy rays from the stamper S side. This cures the stamper-receiving layer 11.

At this time, the curing of the energy rays-curable material produces shrinkage stress in the stamper-receiving layer 11, but the adhesive layer 12 is able to moderate the shrinkage stress and reduce the force in the shrinkage direction exerted by the stamper-receiving layer 11 to the optical disk substrate 3, which reduces warpage of the 3 and, also, the resulting optical disk.

After that, as shown in FIG. 3(*e*), the stamper S is separated from the stamper-receiving layer 11. Since the adhesive strength of the adhesive layer 12 to polycarbonate is at least 200 mN/25 mm, and the adhesive layer 12 is bonded at high adhesive strength to the polycarbonate portion around the edges of the optical disk substrate 3, the separation of the adhesive layer 12 and the optical disk substrate 3 is prevented when the stamper S is separated from the stamper-receiving layer 11.

Once the concavo-convex pattern of the stamper S has been transferred to and fixed on the stamper-receiving layer 11 to form pits or grooves as above, a translucent reflective layer 4' composed of a metal thin layer is then formed on the surface of the stamper-receiving layer 11 by sputtering or another such means as shown in FIG. 3(*f*).

Finally, as shown in FIG. 3(*g*), the cover sheet 6 is laminated to the translucent reflective layer 4' via the adhesive 5 to obtain an optical disk.

The result of the above is that interlayer separation is prevented, and an optical disk with almost no warpage (less than 0.2° warpage) is obtained.

Note that, the optical disk producing methods (1) and (2) given above are nothing but examples, and the method for producing an optical disk using the optical disk producing sheet pertaining to this embodiment is not limited to these two producing methods.

The embodiment described above was given for the sake of facilitating an understanding of the present invention, and not for the purpose of limiting the present invention. Therefore, the elements disclosed in the above embodiment also encompass all design modifications and equivalents that fall within the technical scope of the present invention.

For example, the release sheet 13 or the release sheet 13' can be omitted in the optical disk producing sheet 1.

EXAMPLES

The present invention will now be described in more specific terms through examples and the like, but the scope of the present invention is not limited to these examples and the like.

Example 1

1. Production of Coating Agent A for Stamper-Receiving Layer 80 parts by weight of n-butyl acrylate and 20 parts by weight of acrylic acid were reacted in a mixed solvent of ethyl acetate and methyl ethyl ketone (50:50 weight ratio). To the resulting acrylic ester copolymer solution (solids concentration: 35 wt %) was added 2-methacryloyloxyethyl isocyanate in an amount of 30 equivalents per 100 equivalents of acrylic acid in the copolymer. They were reacted for 48 hours at 40° C. under a nitrogen atmosphere, which gave an energy rays-curable copolymer that had an energy rays-curable group on a side chain thereof and had a weight average molecular weight of 850,000.

4.0 parts by weight of oligo{2-hydroxy-2-methyl-1-[4-(1-propenyl)phenyl]propanone} which is a photopolymerization initiator (Esacure KIP 150, made by Lamberti Spa), 100 parts by weight of a composition composed of an energy rays-curable polyfunctional monomer and oligomer (Seika Beam 14-29B (NPI), made by Dainichiseika Colour & Chemicals), and 1.2 parts by weight of a crosslinking agent composed of a polyisocyanate compound (Oribain BHS-8515, made by Toyo Ink) were dissolved per 100 parts by weight of solids of the energy rays-curable copolymer solution obtained above. The solids concentration was adjusted to 40 wt %, which gave a coating agent A for stamper-receiving layer.

2. Production of Coating Agent B for Adhesive Layer 75 parts by weight of n-butyl acrylate, 22 parts by weight of ethyl acrylate, 3 parts by weight of acrylic acid, and 0.5 part by weight of 2-hydroxyethyl acrylate were reacted in an ethyl acetate solvent to obtain an acrylic ester copolymer with a weight average molecular weight of 800,000.

0.06 part by weight of a metal chelate compound as a crosslinking agent (Alumichelate D made by Kawasaki Fine Chemical) was added per 100 parts by weight of solids of the acrylic ester copolymer obtained above, and the solids concentration was adjusted to 25 wt %, which gave an coating agent B for adhesive layer.

3. Production of Optical Disk Producing Sheet

Two types of release sheet were prepared: a heavy-release type of release sheet (SP-PET3811, made by Lintec, surface roughness (Ra): 0.016 μm) produced by release treatment of one side of a polyethylene terephthalate (PET) film (thickness: 38 μm) with a heavy-release type of silicone resin, and a light-release type of release sheet (SP-PET3801, made by Lintec, surface roughness (Ra): 0.023 μm) produced by release treatment of one side of a PET film (thickness: 38 μm) with a light-release type of silicone resin.

The coating agent A was applied to the release-treated side of the heavy-release release sheet with a knife coater, and the coating was dried for 1 minute at 90° C. to form a stamper-receiving layer with a thickness of 10 μm. The release-treated side of the light-release release sheet was applied to the surface of the stamper-receiving layer. Another light-release release sheet was then coated with the coating agent B with a knife coater, and the coating was dried for 1 minute at 90° C. to form an adhesive layer with a thickness of 15 μm. The light-release release sheet on the stamper-receiving layer was peeled away, and the exposed stamper-receiving layer was faced the surface of the adhesive layer. The adhesive layer and the stamper-receiving layer were laminated to obtain an optical disk producing sheet with a total thickness of 25 μm.

Example 2

1. Production of Coating Agent C for Stamper-Receiving Layer 80 parts by weight of 2-ethylhexyl acrylate and 20 parts by weight of 2-hydroxyethyl acrylate were reacted in an ethyl acetate solvent. To the resulting acrylic ester copolymer solution (solids concentration: 40 wt %) was added 2-methacryloyloxyethyl isocyanate in an amount of 78.5 equivalents per 100 equivalents of 2-hydroxyethyl acrylate in the copolymer, and 0.025 part by weight of dibutyltin dilaurate was added as a catalyst. They were reacted for 48 hours at 40° C. under a nitrogen atmosphere, which gave an energy rays-curable copolymer that had an energy rays-curable group on a side chain thereof and had a weight average molecular weight of 800,000.

3.8 parts by weight of 1-hydroxycyclohexyl phenyl ketone as a photopolymerization initiator (Irgacure 184, made by Ciba Specialty Chemicals) was dissolved per 100 parts by weight of solids of the energy rays-curable copolymer solution obtained above, and the solids concentration was adjusted to 33 wt % to obtain a coating agent C for stamper-receiving layer.

2. Production of Coating Agent D for Stamper-Receiving Layer 91 parts by weight of n-butyl acrylate and 9 parts by weight of acrylic acid were reacted in an ethyl acetate solvent to obtain an acrylic ester copolymer with a weight average molecular weight of 600,000. 16.5 parts by weight of a polyisocyanate compound as a crosslinking agent (Oribain BHS-8515, made by Toyo Ink) was added per 100 parts by weight of the solids of the acrylic ester copolymer obtained above, and the solids concentration was adjusted to 30 wt % to obtain a coating agent D for adhesive layer.

3. Production of Optical Disk Producing Sheet

Other than using the above coating agent C for stamper-receiving layer and coating agent D for adhesive layer, an optical disk producing sheet was produced in the same manner as in Example 1.

Example 3

1. Coating Agent for Stamper-Receiving Layer

The coating agent A for stamper-receiving layer produced in Example 1 was used as the coating agent for stamper-receiving layer.

2. Production of Coating Agent E for Adhesive Layer 75 parts by weight of n-butyl acrylate, 10 parts by weight of ethyl acrylate, and 3 parts by weight of acrylic acid were reacted in an ethyl acetate solvent to obtain an acrylic ester copolymer with a weight average molecular weight of 900,000. 15 parts by weight of a composition composed of an energy rays-curable polyfunctional monomer and oligomer (Seika Beam 14-29B (NPI), made by Dainichiseika Colour & Chemicals), 0.6 part by weight of 1-hydroxycyclohexyl phenyl ketone as a photopolymerization initiator (Irgacure 184, made by Ciba Specialty Chemicals), and 3 parts by weight of polyisocyanate compound as a crosslinking agent (Oribain BHS-8515, made by Toyo Ink) were added to 100 parts by weight of solids of the energy rays-curable copolymer solution obtained above. The solids concentration was adjusted to 30%, which gave a coating agent E for adhesive layer.

3. Production of Optical Disk Producing Sheet

Other than using the above coating agent E for stamper-receiving layer, an optical disk producing sheet was produced in the same manner as in Example 1.

Example 4

1. Coating Agent for Stamper-Receiving Layer

The coating agent A for stamper-receiving layer produced in Example 1 was used as the stamper-receiving layer coating agent.

2. Coating Agent for Adhesive Layer

The coating agent E for adhesive layer produced in Example 3 was used as the adhesive layer coating agent.

3. Production of Optical Disk Producing Sheet

The coating agent A was applied to the release-treated side of the heavy-release release sheet with a knife coater, and the coating was dried for 1 minute at 90° C. to form a stamper-receiving layer with a thickness of 10 μm. The release-treated side of the light-release release sheet was applied to the surface of the stamper-receiving layer. Another light-release release sheet was then coated with the coating agent E with a knife coater, and the coating was dried for 1 minute at 90° C., after that the coating agent E was irradiated with UV rays (using an Adwill RAD-2000m/8 made by Lintec; irradiation conditions: luminance of 310 mW/cm$^2$, light quantity of 300 mJ/cm$^2$) to form an adhesive layer with a thickness of 15 μm. The light-release release sheet on the stamper-receiving layer was peeled away, and the exposed stamper-receiving layer was faced the surface of the adhesive layer. The adhesive layer and the stamper-receiving layer were laminated to obtain an optical disk producing sheet with a total thickness of 25 μm.

Comparative Example 1

The coating agent A prepared in Example 1 was applied to the release-treated side of the same heavy-release release sheet as in Example 1 with a knife coater, and the coating was dried for 1 minute at 90° C. to form a stamper-receiving layer with a thickness of 25 µm. The same light-release release sheet as in Example 1 was laminated on the surface of the stamper-receiving layer to obtain an optical disk producing sheet.

Comparative Example 2

Other than changing the crosslinking agent in the coating agent A prepared in Example 1 to N,N,N',N'-tetraglycidyl-metaxylenediamine (Tetrad-X, made by Mitsubishi Gas Chemical), an optical disk producing sheet was produced in the same manner as in Comparative Example 1.

Experiments

1. Measurement of Storage Elastic Modulus

The storage elastic modulus of the stamper-receiving layer prior to curing and the storage elastic modulus of the adhesive layer, which were formed in the examples and comparative examples, were measured at 1 Hz and 25° C. using a viscoelasticity measurement apparatus (Dynamic Analyzer RDA II, made by Rheometrics). The results are given in Table 1.

Also, the stamper-receiving layers formed in the examples and comparative examples were irradiated with UV rays (using an Adwill RAD-2000m/8 made by Lintec; irradiation conditions: luminance of 310 mW/cm$^2$, light quantity of 300 mJ/cm$^2$) and the storage elastic modulus of the stamper-receiving layer after curing was measured at 3.5 Hz and 25° C. using a viscoelasticity measurement apparatus (Rheovibron DDV-II-EP, made by Orientec). The results are given in Table 1.

2. Production of Optical Disk

An optical disk substrate composed of polycarbonate and having a concavo-convex pattern on one side (thickness: 1.1 mm, outside diameter: 120 mm) was formed by injection molding, and a silver alloy reflective layer with a thickness of 80 nm was formed by sputtering over the concavo-convex pattern. No concavo-convex pattern or silver alloy reflective layer was formed around the edge portion (1 mm width) of the optical disk substrate.

The optical disk producing sheets produced in the examples and comparative examples were punched out in the same shape as the above-mentioned optical disk substrate, the light-release release sheet was peeled off, and the exposed adhesive layer was laminated to the concavo-convex pattern side of the optical disk substrate and press bonded at a pressure of 29 N.

The heavy-release release sheet was then peeled off the stamper-receiving layer, and a transparent stamper made of norbornene resin was placed over the exposed stamper-receiving layer in a 25° C. atmosphere and press bonded at a pressure of 29 N, and the concavo-convex pattern of the stamper was transferred onto the stamper-receiving layer.

Next, the stamper-receiving layer was irradiated with ultraviolet rays from the stamper side (using an Adwill RAD-2000m/8 made by Lintec; irradiation conditions: luminance of 310 mW/cm$^2$, light quantity of 300 mJ/cm$^2$) to cure the stamper-receiving layer and fix the concavo-convex pattern.

The stamper was separated from the stamper-receiving layer, after that a translucent reflective layer composed of a silver alloy and having a thickness of 10 nm was formed by sputtering on the surface of the stamper-receiving layer. A pressure sensitive adhesive layer (thickness: 20 µm) which was formed separately using the coating agent B was laminated on the translucent reflective layer, further a cover sheet composed of polycarbonate resin (Pure Ace C110-80, made by Teijin; thickness: 80 µm) was laminated on the pressure sensitive adhesive layer. They were press bonded to obtain an optical disk.

After the being separated from the stamper-receiving layer, the stamper surface was examined at 200 power with a laser microscope (1LM21 scanning laser microscope, made by LaserTech), which revealed no deposits on the surface of any of the stampers.

3. Measurement of Optical Disk Warpage

Each of the optical disks obtained above was placed in the mechanical chuck of a disk inspection spindle motor (made by Chiba Precision; motor: DSBF50G-38M-249, driver: EDA-08C-012), the optical disk was irradiated with a laser using a high-precision laser angle measurement device (made by Keyence; sensor head: LA-2010, controller: LA-2000), and the angle of the reflected laser was measured. The warpage of the optical disk was measured using the angle of the reflected laser as the angle of warpage of the optical disk. The results are given in Table 1.

4. Measurement of Adhesion to Polycarbonate

(1) Production of Samples for Examples

The release-treated sides of release sheets were coated by knife coater with the coating agents for adhesive layer prepared in the examples, each coating was dried for 1 minute at 90° C. to form an adhesive layer with a thickness of 15 µm, and a PET film with a thickness of 50 µm was applied to the surface thereof. When the adhesive layer coating agent of Example 4 was used, an adhesive layer with a thickness of 15 µm was formed by irradiating with UV rays (using an Adwill RAD-2000m/8 made by Lintec; irradiation conditions: luminance of 310 mW/cm$^2$, light quantity of 300 mJ/cm$^2$) after the coating of the adhesive layer coating agent had been dried, and a PET film with a thickness of 50 µm was applied to the surface of the adhesive layer.

Next, the release sheet was peeled off, and the exposed adhesive layer was press bonded to a polycarbonate plate at a pressure of 20 N.

(2) Production of Samples for Comparative Examples

The light release sheet was peeled off each of the optical disk producing sheets produced in the comparative examples, and a PET film with a thickness of 50 µm was applied with a laminator to the exposed stamper-receiving layer. The heavy release sheet was then peeled off, and the exposed adhesive layer was press bonded to a polycarbonate plate at a pressure of 20 N.

Each of the above samples was irradiated with UV rays from the PET film side (using an Adwill RAD-2000m/8 made by Lintec; irradiation conditions: luminance of 310 mW/cm$^2$, light quantity of 300 mJ/cm$^2$). After that, each sheet was peeled from the polycarbonate plate, and the 180° peel strength at this time was measured. The results are given in Table 1.

TABLE 1

| | | | Storage elastic modulus (Pa.25° C.) | Disk warpage (deg.) | Adhesive strength to polycarbonate (mN/25 mm) |
|---|---|---|---|---|---|
| Example 1 | stamper-receiving layer | prior to curling | $7.42 \times 10^4$ | −0.09 | — |
| | | after curling | $1.62 \times 10^9$ | | |
| | adhesive layer | | $1.86 \times 10^5$ | | 1750 |
| Example 2 | stamper-receiving layer | prior to curling | $6.14 \times 10^4$ | −0.08 | — |
| | | after curling | $3.20 \times 10^8$ | | |
| | adhesive layer | | $2.41 \times 10^5$ | | 1500 |
| Example 3 | stamper-receiving layer | prior to curling | $7.42 \times 10^4$ | −0.12 | — |
| | | after curling | $1.62 \times 10^9$ | | |
| | adhesive layer | prior to curling | $1.33 \times 10^5$ | | 850 |
| | | after curling | $5.53 \times 10^6$ | | |
| Example 4 | stamper-receiving layer | prior to curling | $7.42 \times 10^4$ | −0.10 | — |
| | | after curling | $1.62 \times 10^9$ | | |
| | adhesive layer | | $5.53 \times 10^6$ | | 700 |
| Compar. Example 1 | stamper-receiving layer | prior to curling | $7.42 \times 10^4$ | −0.20 | 90 |
| | | after curling | $1.62 \times 10^9$ | | |
| Compar. Example 2 | stamper-receiving layer | prior to curling | $7.40 \times 10^4$ | −0.24 | 145 |
| | | after curling | $1.16 \times 10^9$ | | |

As is clear from Table 1, an optical disk obtained using one of the optical disk producing sheets of the examples warps far less than an optical disk obtained using one of the optical disk producing sheets of the comparative examples. Also, the optical disk producing sheets of the examples have much higher adhesion strength to polycarbonate than the optical disk producing sheets of the comparative examples.

INDUSTRIAL APPLICABILITY

With the optical disk producing sheet of the present invention, separation that occurs during the production of an optical disk, or during the storage of the finished product, is prevented, and warpage in the resulting optical disk is reduced. Namely, the optical disk producing sheet of the present invention is useful in the production of optical disks because which can prevent or reduce warpage and interlayer separation.

The invention claimed is:

1. An optical disk producing sheet, comprising:
    a stamper-receiving layer that is energy rays-curable and has a storage elastic modulus prior to curing from $10^3$ to $10^7$ Pa;
    an adhesive layer directly laminated to the stamper-receiving layer, the adhesive layer having adhesive strength to polycarbonate of at least 200 mN/25 mm and a storage elastic modulus during the curing of the stamper-receiving layer of from $10^3$ to $10^7$ Pa; and
    a top release sheet and/or a bottom release sheet.

2. The optical disk producing sheet according to claim 1, wherein the adhesive layer is a pressure sensitive adhesive.

3. The optical disk producing sheet according to claim 2, wherein the pressure sensitive adhesive includes an acrylic ester copolymer.

4. The optical disk producing sheet according to claim 1, wherein the stamper-receiving layer includes an acrylic ester copolymer having an energy rays-curable group on a side chain thereof.

5. The optical disk producing sheet according to claim 1, wherein the stamper-receiving layer contains a carboxyl group-containing copolymer obtained by copolymerizing at least one type of monomer having a carboxyl group.

6. An optical disk comprising a laminate obtained from an optical disk producing sheet, the laminate including:
    a stamper-receiving layer that is energy rays-curable and has a storage elastic modulus prior to curing from $10^3$ to $10^7$ Pa; and
    an adhesive layer directly laminated to the stamper-receiving layer, the adhesive layer having adhesive strength to polycarbonate of at least 200 mN/25 mm and a storage elastic modulus during the curing of the stamper-receiving layer of from $10^3$ to $10^7$ Pa.

7. The optical disk producing sheet according to claim 6, wherein the adhesive layer is a pressure sensitive adhesive.

8. The optical disk producing sheet according to claim 7, wherein the pressure sensitive adhesive includes an acrylic ester copolymer.

9. The optical disk producing sheet according to claim 6, wherein the stamper-receiving layer includes an acrylic ester copolymer having an energy rays-curable group on a side chain thereof.

10. The optical disk producing sheet according to claim 6, wherein the stamper-receiving layer contains a carboxyl group-containing copolymer obtained by copolymerizing at least one type of monomer having a carboxyl group.

* * * * *